July 20, 1937     H. Y. CARSON ET AL     2,087,752
BELL AND SPIGOT PIPE JOINT
Filed Dec. 12, 1935
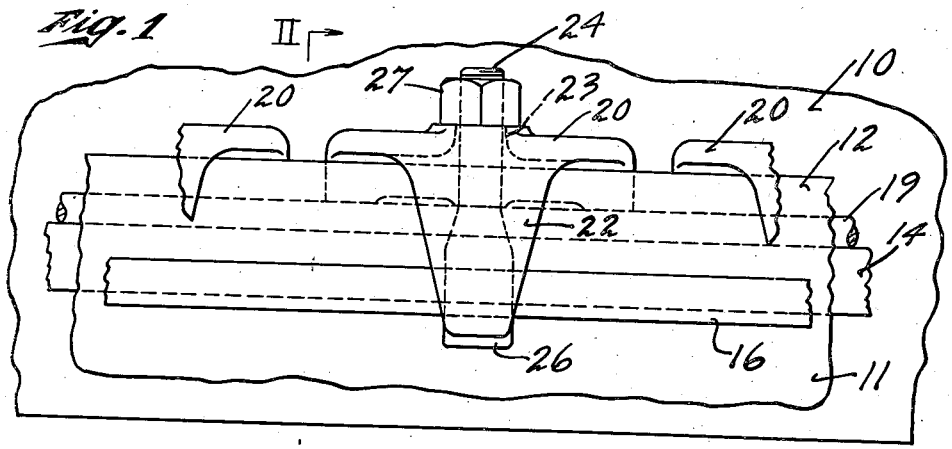
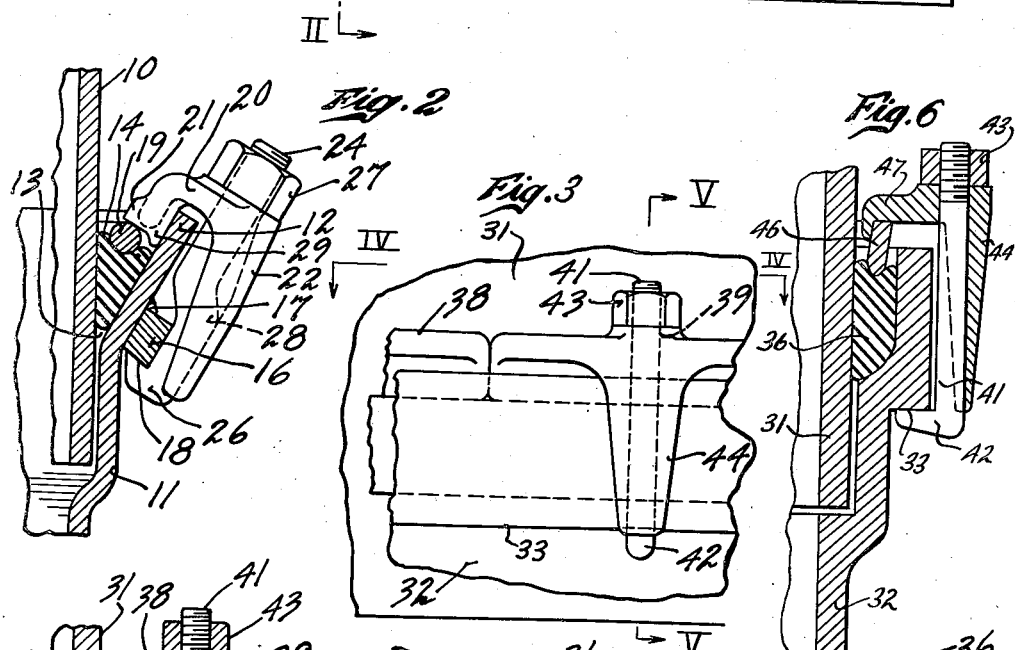
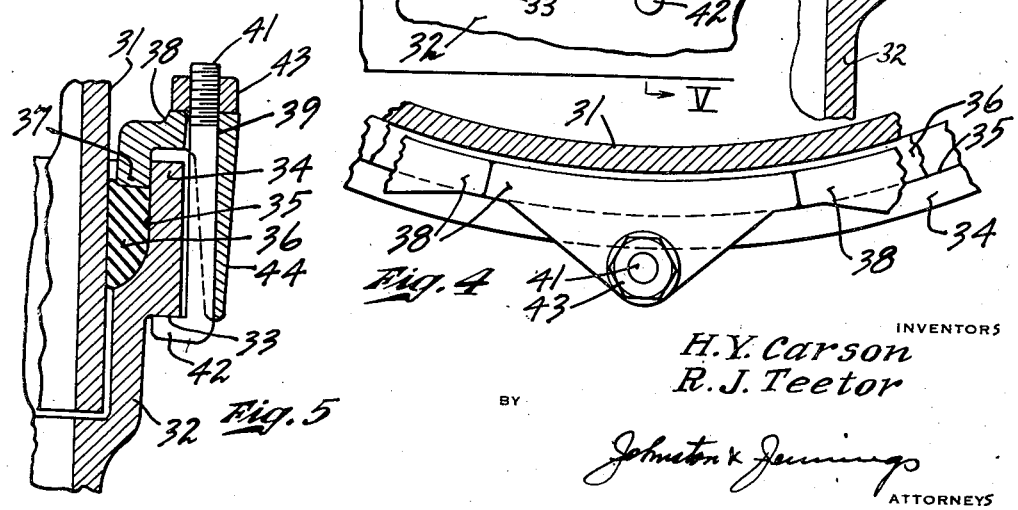
INVENTORS
H. Y. Carson
R. J. Teetor
BY
Johnston & Jennings
ATTORNEYS Patented July 20, 1937

2,087,752

UNITED STATES PATENT OFFICE 2,087,752

BELL AND SPIGOT PIPE JOINT

Harry Y. Carson, Birmingham, Ala., and Ralph J. Teetor, Cadillac, Mich.

Application December 12, 1935, Serial No. 54,014

6 Claims. (Cl. 285—119)

This invention relates to pipe joints of the bell and spigot type and has for an object the provision of means for packing such joints which shall include separate and independent clamp members adapted to bear upon and firmly hold the packing in place in the joint, and which may be separately applied and separately removed.

Another object of our invention is the provision of a packing means which shall be especially adapted to the packing of pipe joints where the pipe is of relatively large diameter, and which shall readily adapt itself to irregularities in pipe diameter and in contour, especially encountered in such pipe.

A further object of our invention is the provision of packing means for pipe joints of the bell and spigot type which shall include a minimum number and weight of parts, be of extremely simple design, economical of manufacture, and which shall involve a minimum of labor in its application.

In the design of packing joints of the gland type for bell and spigot pipe, as heretofore known to the art, there has usually been employed one or more relatively heavy rings embracing one or both the bell and spigot ends of the pipe, which include means for pressing against a suitable gasket inserted in the recess between the bell and spigot ends. Where the pipe is of relatively large diameter it has been the practice to make the rings in two or more sections secured together by suitable means, whereby to simplify their application.

While such joints have rendered satisfactory service, they have involved castings of considerable weight and a multiplicity of parts. In accordance with our invention, by slight modification of the bell end of the pipe, we are enabled to provide a packing means of the gland type in which what corresponds to the gland bolts in our improved packing are caused to engage and take a purchase upon a suitable surface provided on the bell of the pipe, and in which independent elements, independently and separately applied, are caused to engage tightly and hold the gasket in place.

Devices embodying features of our invention are illustrated in the accompanying drawing forming a part of this application, in which Fig. 1 is a fragmentary plan view of one form of our invention;

Fig. 2 is a sectional view taken along the line II—II of Fig. 1;

Fig. 3 is a plan view showing another form of our invention;

Fig. 4 is a sectional view taken along the line IV—IV of Fig. 3;

Fig. 5 is a sectional view taken along the line V—V of Fig. 3; and

Fig. 6 is a sectional view showing a still further modified form of our invention.

Referring to the drawing, we show in Figs. 1 and 2, the spigot end 10 of a steel pipe inserted in the corresponding bell end 11 of its adjacent pipe. The outer end of the bell end of the pipe 10 is flared, as shown at 12, to form a packing recess 13. In the packing recess 13 is placed a gasket 14 of suitable packing material, such as rubber. Around the base of the flared portion 12 of the bell end of the pipe, is disposed a band 16, which may be secured to the bell end by any suitable means, such as by tacking welds 17. The band 16 is preferably trapezoidal in cross section and disposed so that the side 18 remote from the adjacent end of the pipe is inclined with respect to the pipe to provide an undercut surface, as shown in the drawing. We may employ a metallic ring 19 surrounding the spigot end of the pipe 10 and bearing against the gasket 14 in the packing space 13.

The assembly just described is held in place by a suitable number of clamp members, which will presently be described. The number of clamp members employed may depend upon the service to which the pipe is put and the internal pressure within the pipe, but for best results the clamp members should be placed closely adjacent around the entire perimeter of the joint. Each of the clamp members comprises a gland portion 21 which hooks over the flared portion 12 of the bell end of the joint and, in the modification as shown in Figs. 1 and 2, engages with the circular metallic ring 19 which bears against the gasket 14. The inner surface of the gland portion 21 is made to conform to and engage with the inner surface of the flared end 12.

Extending substantially normal to the gland portion 21 is a body portion 20 having a bolt hole 23 therein. Extending substantially parallel to the gland portion 21 of the clamp member is a shield 22 which extends toward the band 16 on the outside of the flared portion 12 and which is formed to embrace partiallly a clamping bolt 24 which extends through the bolt hole 23.

The clamping bolt 24 is formed with a hook portion 26 which engages the band 16 and, when the nut 27 on the bolt 24 is tightened up, causes the gland portion 21 of the clamping member to engage tightly the steel ring 19 and flared portion 12 and force the gasket 14 tightly into the packing space 13. The bolt 24 may be offset at 28 in order to reduce the material required for the clamp member, to bring the point of engagement of the nut 27 nearer to the flared portion 12 and to bring the direction of force exerted by the bolt 24 parallel to the flared portion 12. The shield portion 22 of the clamp member engages the bolt 24 to hold the hook 26 into tight engagement with the band 16.

As shown in Figs. 1 and 2, where a steel ring 19 is employed to bear against the gasket 14, the gland portion 21 may be formed with separate bearing fingers 29 to engage the ring 19, and thereby obtain a more even distribution of pressure upon the steel ring 19 than if a continuous surface were employed.

In Figs. 3 to 5 we show a modification of our invention adapted for packing cast iron pipe joints of the bell and spigot type. The spigot end of the pipe is shown at 31 and the bell end at 32. In order to adapt the joint for our improved packing means we form the bell end with a rectangular shoulder 33 and extend the outer end of the bell at 34 to form a somewhat deeper cylindrical portion 35 for the bell than has heretofore been the standard practice, for a purpose to be described presently. Within the recess formed between the bell and spigot ends of the joint we dispose a rubber or other suitable gasket 36.

The clamp members employed in connection with the cast iron pipe joint are similar to those already described in connection with the steel pipe joint. They embody gland portions 37 which bear against the gasket 36, but which may comprise a continuous surface bearing against the gasket 36 and thus obviate the necessity of the continuous metallic ring 19. The gland portions 37 are also formed to bear against the cylindrical wall of the recess 35 formed by the bell extension 34. The clamp members are each provided with a body portion 38 having a bolt hole 39 therein through which is inserted a clamp bolt 41 having a hook portion 42 engaging the rectangular shoulder 33 on the bell end of the pipe. The bolt 41 is provided with a nut 43 to draw the hook portion 42 into tight engagement with the surface 33, and the gland portion 37 of the clamp member in tight engagement with the gasket 36 and the cylindrical wall of the recess. The shield portion 44 of each clamp member extends substantially the full length and partially embraces the bolt 41. Also, in accordance with this modification, it will be noted that the bolt 41 is substantially straight and that the shield portion 44 bears against the surface of the bolt 41 throughout its length.

It will be seen that in tightening the nut 43, engagement of the gland portion 37 with the cylindrical wall of the extension 34, serves to draw the hook portion 42 inwardly of the bell end of the pipe and there is no tendency for the hook portion 42 of the bolt to move outwardly and become disengaged from the rectangular shoulder 33. This action is also aided by the direction of force in tightening the nut 43, in that the hook portion acts as a fulcrum for the force applied by the nut 43 to force the hook portion 42 into tight engagement with the rectangular shoulder 33. The action just described is further aided by the shield portion 44 of the clamp member engaging the bolt 41 and acting as a reenforcement to the clamp member. Further, the shield portion 44, bearing against the bolt 41, causes the gland portion 37 to move in parallelism with the bolt against the gasket 36.

In accordance with this modification, where no metallic ring 19 is employed to bear against the packing gasket, the clamp members should be placed around the perimeter of the joint abutting each other, as shown in Fig. 4, so as to provide an even distribution of pressure against the gasket entirely around the joint.

Referring now to Fig. 6, we show a still further modified form of our invention. This modification is illustrated with a cast iron bell and spigot joint, as described in Figs. 3 to 5 inclusive. Instead, however, of gland members bearing directly against the gasket 36, we provide a metallic ring 46 for bearing against the gasket, which ring is preferably elongated in cross section and made to flare outwardly slightly away from the gasket, as shown in the drawing. The clamp members, according to this modification, are provided with hook portions 47 which hook over the ring 46 and press it into the recess against the gasket 36 when the nut 43 is tightened on the bolt 42. With the arrangement just described, the ring 46 is self-centering on the gasket 36 and, in turn, holds the clamp members in place by reason of the hook portions 47 hooking over the ring.

It will be seen from the foregoing that our improved packing joint, comprising independent, separately applied and separately removable members for holding the packing material in place, readily adapts itself to irregularities in surface and contour of the pipe sections. For example, if one section of pipe be slightly out of round with respect to its adjoining section, and the packing recess be deeper at some points than others, our improved joint permits the gasket or packing material to be pressed into the packing recess deeper in some places than others but with substantially even pressure all around, thus accommodating itself to the inequalities in depth. Our improved joint is furthermore of especial advantage in connection with pipe joints where the adjoining sections are angularly disposed with respect to each other and where there are always inequalities in depth of the packing recess.

While we have shown our invention in but three forms, it will be obvious to those skilled in the art that it is not so limited, but is susceptible of various other changes and modifications, without departing from the spirit thereof, and we desire, therefore, that only such limitations shall be placed thereupon as are imposed by the prior art or as are specifically set forth in the appended claims.

What we claim is:

1. A clamp member for packing bell and spigot joints comprising a body portion having gland means adapted to hook over the bell of the pipe and clear the adjacent exterior surface of the spigot end of the cooperating pipe, a bolt extending through the body portion on the outside of the bell, a hook on one end of the bolt adapted to engage a surface on the outside of the pipe and draw the gland means inwardly of the bell, and a shield on the body portion of the clamp member partially embracing and engaging the bolt.

2. A packing means for bell and spigot pipe joints comprising a gasket in the recess between the bell and spigot ends of the pipe, a metallic ring bearing against the gasket in the recess, means forming a retaining shoulder near the bell end of the pipe, a multiplicity of separate clamp members disposed about the joint, means on the clamp members bearing against the ring and clearing the adjacent exterior surface of the spigot end of the pipe, and anchoring bolts cooperating between the shoulder and the clamp members to draw the clamp members into pressure exerting relation with the ring.

3. Means for packing bell and spigot pipe joints comprising a gasket in the recess between the bell and spigot ends of the pipe, means forming an external anchor retaining shoulder extending around near the bell end of the pipe, separate clamp members for exerting pressure on the packing each comprising a gland portion extending into the recess and bearing against the inner surface of the bell, and having clearance with respect to the exterior surface of the spigot end of the adjacent pipe, a body portion substantially normal to the gland portion and having a bolt hole therein, a shield portion extending substantially parallel to the gland portion, a bolt extending through the body portion, and anchor means on the bolt to engage with the anchor retaining shoulder on the pipe.

4. Means for packing bell and spigot pipe joints as set forth in claim 3, in which a metallic ring is interposed between the gland portions of the clamp members and the gasket.

5. Means for packing bell and spigot pipe joints as set forth in claim 3, in which the means forming a retaining shoulder near the bell end of the pipe comprises a metal band extending around the pipe and secured thereto.

6. Means for packing bell and spigot pipe joints as set forth in claim 3, in which the means forming a retaining shoulder near the bell end of the pipe comprises a metal band trapezoidal in cross section and disposed to present an under cut surface on the side remote from the bell end, said band extending around the pipe and being secured thereto.

HARRY Y. CARSON.
RALPH J. TEETOR.